US012595874B2

(12) United States Patent
Cho et al.

(10) Patent No.: US 12,595,874 B2
(45) Date of Patent: Apr. 7, 2026

(54) SEMI-NONCOMBUSTIBLE BUILDING THERMAL INSULATION MATERIAL AND MANUFACTURING METHOD THEREOF

(71) Applicants: HANKUK CARBON CO., LTD., Miryang-si (KR); Yun-Ho Cho, Seoul (KR)

(72) Inventors: Yun-Ho Cho, Seoul (KR); Young Soo Kwon, Miryang-si (KR); Min Gyu Kim, Gimhae-si (KR); Seung Woo Lee, Miryang-si (KR)

( * ) Notice: Subject to any disclaimer, the term of this patent is extended or adjusted under 35 U.S.C. 154(b) by 468 days.

(21) Appl. No.: 17/441,664

(22) PCT Filed: Apr. 26, 2021

(86) PCT No.: PCT/KR2021/005255
§ 371 (c)(1),
(2) Date: Sep. 21, 2021

(87) PCT Pub. No.: WO2022/220323
PCT Pub. Date: Oct. 20, 2022

(65) Prior Publication Data
US 2024/0027015 A1 Jan. 25, 2024

(30) Foreign Application Priority Data

Apr. 14, 2021 (KR) ........................ 10-2021-0048716

(51) Int. Cl.
*F16L 59/02* (2006.01)
*B32B 5/02* (2006.01)
(Continued)

(52) U.S. Cl.
CPC ............ *F16L 59/029* (2013.01); *B32B 5/022* (2013.01); *B32B 5/245* (2013.01); *C09D 5/18* (2013.01); *F16L 59/028* (2013.01); *B32B 2255/02* (2013.01); *B32B 2255/102* (2013.01); *B32B 2255/12* (2013.01); *B32B 2255/20* (2013.01); *B32B 2262/101* (2013.01); *B32B 2264/1021* (2020.08); *B32B 2264/1023* (2020.08); *B32B 2264/104* (2013.01); *B32B 2266/0278* (2013.01); *B32B 2307/3065* (2013.01); *B32B 2307/72* (2013.01); *B32B 2307/7376* (2023.05); *B32B 2419/00* (2013.01)

(58) Field of Classification Search
None
See application file for complete search history.

(56) References Cited

U.S. PATENT DOCUMENTS

| | | | |
|---|---|---|---|
| 3,420,277 A * | 1/1969 | Ceintrey | ................. F16L 59/15 138/146 |
| 2015/0352806 A1 | 12/2015 | Faotto | |
| 2020/0392050 A1 | 12/2020 | Li et al. | |

FOREIGN PATENT DOCUMENTS

| | | |
|---|---|---|
| CN | 101547978 A | 9/2009 |
| JP | 61113685 A | 5/1986 |

(Continued)

*Primary Examiner* — Frank J Vineis
*Assistant Examiner* — Nicole T Gugliotta

(57) ABSTRACT

Provided is a semi-noncombustible building thermal insulation material including: a core layer; and a noncombustible coating layer formed with a thickness of 0.1 to 3 mm on one or both sides of the core layer, wherein the noncombustible coating layer includes aluminum oxide, silicon oxide, sodium silicate, and calcium carbonate.

5 Claims, 2 Drawing Sheets

(51) Int. Cl.
    B32B 5/24         (2006.01)
    C09D 1/02         (2006.01)
    C09D 5/18         (2006.01)
    C09D 7/61         (2018.01)

(56)              References Cited

FOREIGN PATENT DOCUMENTS

| JP | 62074937 A | 4/1987 | |
| JP | H0471802 A | 3/1992 | |
| JP | 2014-062003 A | 4/2014 | |
| KR | 10-2014-0081918 A | 7/2014 | |
| KR | 10-2016-0043874 A | 4/2016 | |
| KR | 10-2016-0130620 A | 11/2016 | |
| KR | 10-2019-0030148 A | 3/2019 | |
| KR | 10-2200831 B1 | 1/2021 | |
| KR | 10-2021-0018068 A | 2/2021 | |
| WO | WO 86/00122 * | 1/1986 | ........... F16L 59/029 |
| WO | 95/28531 A | 10/1995 | |
| WO | WO 2014/160665 A1 * | 2/2014 | ........... F16L 59/028 |

* cited by examiner

[FIG. 1]
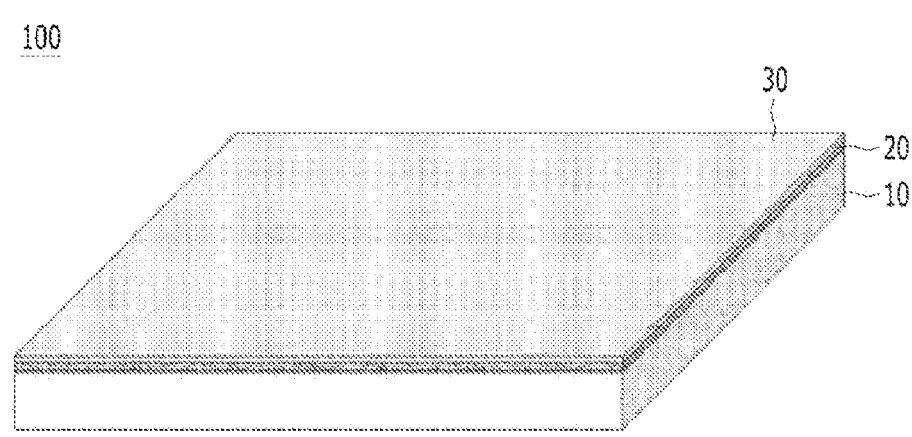
[FIG. 2]
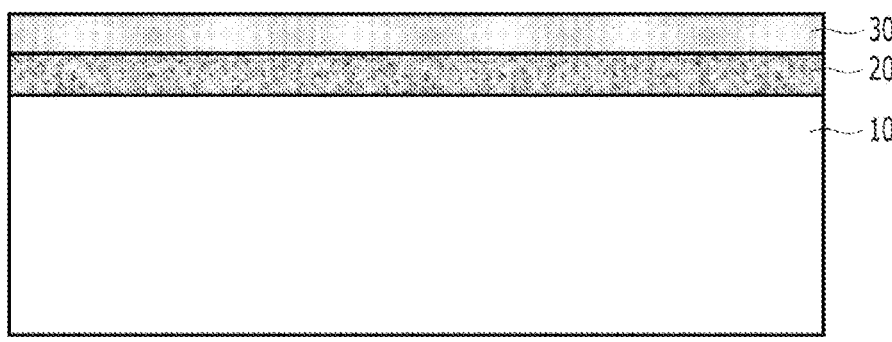
[FIG. 3]
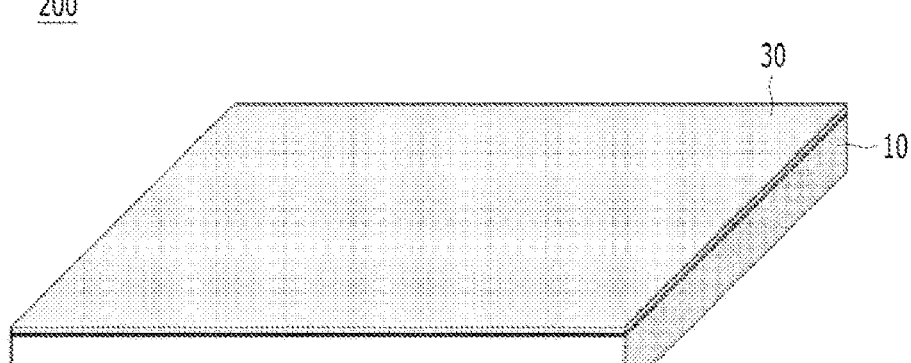

[FIG. 4]
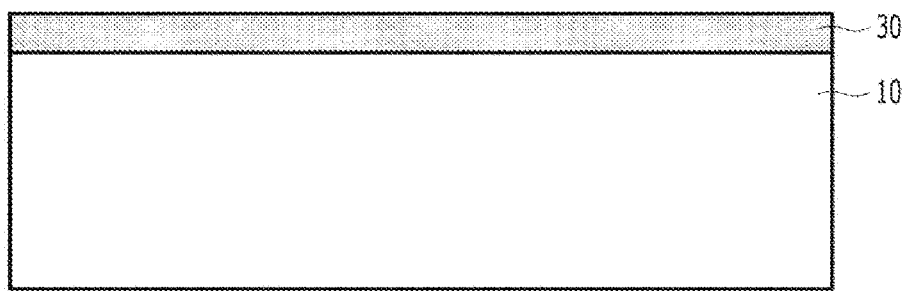
[FIG. 5]
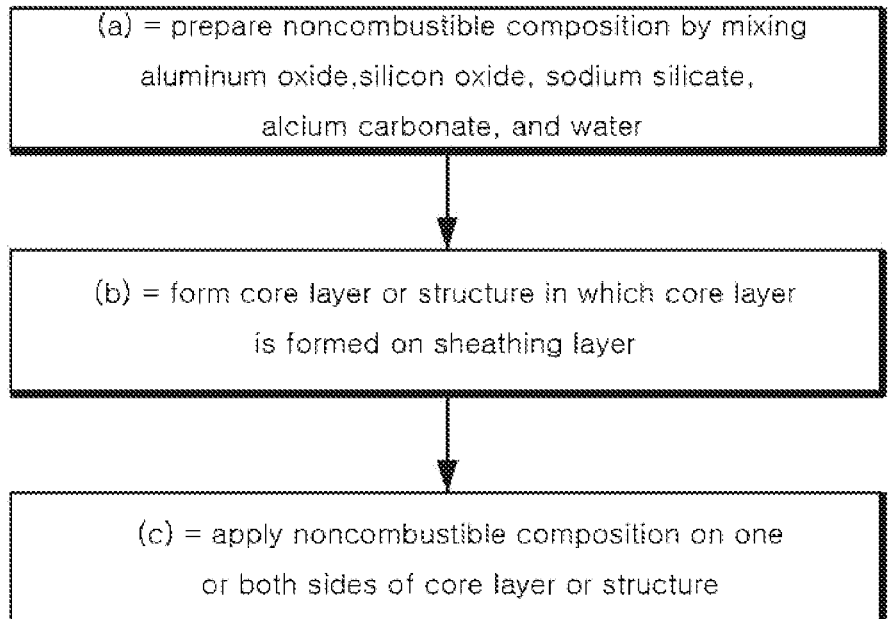

SEMI-NONCOMBUSTIBLE BUILDING THERMAL INSULATION MATERIAL AND MANUFACTURING METHOD THEREOF

TECHNICAL FIELD

Embodiments of the present invention relate to a thermal insulation material among building materials, and more particularly, to a thermal insulation material having excellent fire resistance performance and a manufacturing method thereof.

BACKGROUND ART

Thermal insulation materials are attached to the exterior walls of buildings to maintain the building's temperature. In general, polyurethane foam and styrofoam are widely used thermal insulation materials, but these thermal insulation materials have the disadvantage of generating a large amount of flammable and toxic gases in case of fire. As these shortcomings continue to cause harm to human life and property, the demand for materials with excellent fire resistance performance is increasing for public safety.

Fire resistance materials are divided into noncombustible materials, semi-noncombustible materials, and flame-retardant materials according to the level of fire resistance performance exhibited. Noncombustible materials are materials that do not burn, and examples thereof include concrete, stone, brick, tile, steel, aluminum, and the like. Semi-noncombustible materials are materials with properties similar to noncombustible materials, and examples thereof include wood wool board, pulp cement board, gypsum board, and the like. Flame-retardant materials are materials that do not burn easily, and examples thereof include flame-retardant plywood, flame-retardant plastics, and the like.

Conventionally, in order to strengthen the noncombustible performance of a building thermal insulation material, a sheathing material including an aluminum laminated sheet (sheet formed by laminating an aluminum thin film and glass fiber or laminating an aluminum thin film and kraft paper) was applied to the outermost part of the thermal insulation material. However, a method of manufacturing a sheathing material including an aluminum laminated sheet has the following problems. First, the aluminum laminated sheet may be wrinkled due to having a small thickness of 0.1 to 0.4 mm and may be easily delaminated from a core material due to having low adhesion with the core material. Second, since an aluminum thin film forming the aluminum laminated sheet has a thickness of 0.007 to 0.025 mm and is very thin, the thin film is prone to wrinkling and tearing, and thus is very difficult to handle. Third, in the manufacture of a thermal insulation material, since a multi-step process for producing the aluminum laminated sheet is required, and separate equipment is required, the manufacturing costs of the thermal insulation material increase.

Therefore, it is necessary to develop a semi-noncombustible building thermal insulation material technology that can solve the problems of aluminum laminated sheets while having the above-described semi-noncombustible performance.

DISCLOSURE

Technical Problem

The present invention is directed to providing a thermal insulation material having excellent noncombustible performance without using an aluminum laminated sheet.

Technical Solution

In one embodiment, a semi-noncombustible building thermal insulation material of the present invention includes: a core layer; and a noncombustible coating layer formed with a thickness of 0.1 to 3.0 mm on one or both sides of the core layer, wherein the noncombustible coating layer includes aluminum oxide, silicon oxide, sodium silicate, and calcium carbonate.

In another embodiment, a semi-noncombustible building thermal insulation material of the present invention includes: a core layer; a sheathing layer provided on one or both sides of the core layer; and a noncombustible coating layer provided on the opposite side of one side of the sheathing layer in contact with the core layer or between the sheathing layer and the core layer, and having a thickness of 0.1 to 3.0 mm, wherein the noncombustible coating layer includes aluminum oxide, silicon oxide, sodium silicate, and calcium carbonate.

The noncombustible coating layer of the present invention may be formed by applying a noncombustible composition including 11 to 23 parts by weight of aluminum oxide, 15 to 21 parts by weight of silicon oxide, 19 to 32 parts by weight of sodium silicate, 15 to 21 parts by weight of calcium carbonate, and 15 to 28 parts by weight of water.

The core layer of the present invention includes one or more selected from the group consisting of polyurethane foam, polyisocyanurate foam, phenolic foam, expanded styrene foam, extruded styrene foam, melamine foam, polyethylene foam, polypropylene foam, ethylene vinyl acetate copolymer foam, polyimide foam, polyvinyl chloride foam, and silicone foam and has a density of 15 to 60 kg/m$^3$ and a thickness of 20 to 200 mm.

The noncombustible coating layer of the present invention does not include an organic binder, and the semi-noncombustible building thermal insulation material of the present invention does not include an aluminum material.

The sheathing layer of the present invention includes one selected from the group consisting of polyolefin-based nonwoven fabric, kraft paper, glass fiber mesh, glass fiber fabric, and glass fiber tissue.

A method of manufacturing a semi-noncombustible building thermal insulation material of the present invention includes: (a) preparing a noncombustible composition by mixing aluminum oxide, silicon oxide, sodium silicate, calcium carbonate, and water; (b) forming a core layer or a structure in which a core layer is formed on a sheathing layer; and (c) applying the noncombustible composition on one or both sides of the core layer or the structure, wherein the applying of the noncombustible composition in step (c) is carried out by one method selected from the group consisting of a roll-coating method, a knife-coating method, a reverse roll-coating method, and a spray-coating method.

Advantageous Effects

A semi-noncombustible building thermal insulation material of the present invention has the following effects.

First, since an aluminum laminated sheet, the production of which requires large costs and a complicated process, is not used, production costs can be lowered, and a production process can be simplified.

Second, even though an aluminum laminated sheet is not used, excellent noncombustible performance is exhibited.

Third, compared to a thermal insulation material including an aluminum laminated sheet, adhesion with a core layer and a sheathing layer is excellent, and handling in the field is easy.

Fourth, when a noncombustible coating layer does not include an organic binder, there is an effect that volatile organic compounds (VOCs) are not generated.

DESCRIPTION OF DRAWINGS

FIG. 1 is a perspective view of a semi-noncombustible building thermal insulation material including a sheathing layer according to one embodiment of the present invention.

FIG. 2 is a cross-sectional view of the semi-noncombustible building thermal insulation material of FIG. 1 according to one embodiment of the present invention.

FIG. 3 is a perspective view of a semi-noncombustible building thermal insulation material according to one embodiment of the present invention.

FIG. 4 is a cross-sectional view of the semi-noncombustible building thermal insulation material of FIG. 3 according to one embodiment of the present invention.

FIG. 5 is a flowchart illustrating a method of manufacturing a semi-noncombustible building thermal insulation material according to one embodiment of the present invention.

EMBODIMENTS

Since the present invention can have various modifications and various embodiments, specific embodiments will be illustrated in the drawings and described in detail in the detailed description. However, it is not intended to limit the present invention to specific embodiments, and it should be understood that all modifications, equivalents, and substitutes are included in the spirit and scope of the present invention. In describing the present invention, when it is determined that a detailed description of related known technology may obscure the gist of the present invention, the detailed description will be omitted.

The terms used in the present application are used only to describe specific embodiments, and are not intended to limit the present invention. The singular expression includes the plural expression unless the context clearly dictates otherwise.

In the present application, it should be understood that terms such as "comprise," "include," "contain," or "have" are intended to specify the presence of stated features, numbers, steps, operations, components, parts, or combinations thereof and do not preclude the possibility of the presence or addition of one or more other features, numbers, steps, operations, components, parts, or combinations thereof.

FIG. 1 is a perspective view of a semi-noncombustible building thermal insulation material 100 including a sheathing layer according to one embodiment of the present invention. Referring to FIG. 1, the semi-noncombustible building thermal insulation material 100 including a sheathing layer according to the present invention includes: a core layer 10; a sheathing layer 20 formed on one side of the core layer; and a noncombustible coating layer 30 provided on the opposite side of one side of the sheathing layer in contact with the core layer. Although, in the embodiment illustrated in FIG. 1, a sheathing layer is formed on one side of a core layer, the present invention is not limited in this aspect, and the sheathing layer may be formed on both sides of the core layer. In addition, although, in the embodiment illustrated in FIG. 1, a noncombustible coating layer is formed on one side of a sheathing layer not in contact with a core layer, the present invention is not limited in this aspect, and the noncombustible coating layer may also be formed between the core layer and the sheathing layer.

In one specific embodiment, the semi-noncombustible building thermal insulation material illustrated in FIG. 1 may be manufactured by using kraft paper as the sheathing layer 20 and forming urethane foam on one side of the kraft paper to form the core layer 10. On one side of the sheathing layer 20 on which the core layer is not formed, a noncombustible composition is applied to form the noncombustible coating layer 30.

FIG. 3 is a perspective view of a semi-noncombustible building thermal insulation material 200 according to another embodiment of the present invention. Referring to FIG. 3, the semi-noncombustible building thermal insulation material 200 of the present invention may include a core layer 10 and a noncombustible coating layer 30 formed on one side of the core layer. In this case, the core layer may be urethane foam, and the above-described building thermal insulation material of the embodiment may be manufactured by applying a noncombustible composition of the present invention on the urethane foam to form the noncombustible coating layer 30.

The present invention is characterized in that the noncombustible coating layer is formed to replace an aluminum laminated sheet in order to impart noncombustible performance to the thermal insulation material. Accordingly, the thermal insulation of the present invention has noncombustible performance equivalent to that of a thermal insulation material including an aluminum laminated sheet due to the noncombustible coating layer. In addition, since the noncombustible coating layer of the present invention is formed by applying a noncombustible composition to the core layer or the sheathing layer, the method of forming the noncombustible coating layer is simple, and there is also the advantage of forming the noncombustible coating layer in a continuous process after the manufacture of the core layer or the sheathing layer. Accordingly, the method for manufacturing a semi-noncombustible building thermal insulation material of the present invention does not require additional equipment for manufacturing an aluminum laminated sheet, so it also has an economic advantage of lowering manufacturing costs.

A noncombustible coating composition for forming the noncombustible coating layer of the present invention includes aluminum oxide, silicon oxide, sodium silicate, and calcium carbonate. When the noncombustible coating composition is mixed with water to form a paste, and the paste is applied to a core material or a sheathing material and dried, the noncombustible coating layer is formed. Since the noncombustible coating layer of the present invention has noncombustible performance equivalent to that of an aluminum laminated sheet, is formed of inorganic materials, and does not contain an organic binder, VOCs are not generated during a drying process or in case of fire.

In a specific example, the noncombustible coating composition used for forming the noncombustible coating layer includes 11 to 23 parts by weight of aluminum oxide, 15 to 21 parts by weight of silicon oxide, 19 to 32 parts by weight of sodium silicate, 15 to 21 parts by weight of calcium carbonate, and 15 to 28 parts by weight of water. When the above numerical ranges are satisfied, the optimal adhesion and noncombustible performance of the noncombustible coating layer can be exhibited.

In a specific example, the thickness of the noncombustible coating layer formed on one side of the core layer or the sheathing layer may be 0.1 to 3.0 mm, preferably 0.15 to 2.5 mm, and more preferably 0.1 to 2 mm. When the thickness of the noncombustible coating layer is less than 0.1 mm, it is not preferable because it is difficult to achieve the desired noncombustible performance, and, on the other hand, when the thickness exceeds 3 mm, it is not preferable in terms of price competitiveness.

In addition, the basis weight of the noncombustible coating layer of the present invention is preferably 200 g/m$^2$ to 1000 g/m$^2$, more preferably 250 g/m$^2$ to 900 g/m$^2$, and most preferably 300 g/m$^2$ to 800 g/m$^2$. When the basis weight of the noncombustible coating layer satisfies the above range, noncombustible performance and price competitiveness can be optimized.

In addition, when the coating layer is formed on both sides of the core layer or the sheathing material, the thickness of the coating layers on the two sides may be different, and the content of aluminum oxide, silicon oxide, sodium silicate, and calcium carbonate of the coating layers on the two sides may be different.

In the present invention, the core layer functions to maintain the shape of the thermal insulation material and minimize heat transfer by preventing the movement of gas molecules. In a specific example, the core layer of the semi-noncombustible building thermal insulation material of the present invention may include one or more selected from the group consisting of polyurethane foam, polyisocyanurate foam, phenolic foam, expanded styrene foam, extruded styrene foam, melamine foam, polyethylene foam, polypropylene foam, ethylene vinyl acetate copolymer foam, polyimide foam, polyvinyl chloride foam, and silicone foam, and may have a density of 15 to 60 kg/m$^3$ and a thickness of 20 to 200 mm.

In one specific example, the core layer of the present invention may be formed by foaming a polyurethane solution on the sheathing layer material.

In addition, the density of the core layer may be 20 to 50 kg/m$^3$, 30 to 40 kg/m$^3$ or 20 to 30 kg/m$^3$, or may be 40 to 50 kg/m$^3$. The thickness of the core layer may be 20 to 160 mm, 20 to 120 mm, 20 to 80 mm, or 20 to 50 mm, or may be 40 to 150 mm or 80 to 120 mm. However, the density and thickness of the core layer are not limited to the above numerical ranges, and may be determined within various ranges including the above numerical ranges.

In the present invention, the sheathing layer includes one selected from the group consisting of polyolefin-based nonwoven fabric, kraft paper, glass fiber mesh, glass fiber fabric, and glass fiber tissue.

The kraft paper preferably has a basis weight of 40 g/m$^2$ to 120 g/m$^2$, more preferably has a basis weight of 50 g/m$^2$ to 110 g/m$^2$, and most preferably has a basis weight of 60 g/m$^2$ to 100 g/m$^2$.

The glass fiber tissue preferably has a basis weight of 25 g/m$^2$ to 120 g/m$^2$, more preferably has a basis weight of 30 g/m$^2$ to 100 g/m$^2$, and most preferably has a basis weight of 30 g/m$^2$ to 80 g/m$^2$.

Hereinafter, a method of manufacturing a semi-noncombustible building thermal insulation material of the present invention will be described in detail. FIG. 5 is a flowchart illustrating a method of manufacturing a semi-noncombustible building thermal insulation material according to one embodiment of the present invention. Referring to FIG. 5, the method of manufacturing a semi-noncombustible building thermal insulation material of the present invention includes: (a) preparing a noncombustible composition by mixing aluminum oxide, silicon oxide, sodium silicate, calcium carbonate, and water; (b) forming a core layer or a structure in which a core layer is formed on a sheathing layer; and (c) applying the noncombustible composition on one or both sides of the core layer or the structure.

The applying of the non-combustible composition in step (c) is carried out by one method selected from the group consisting of a roll-coating method, a knife-coating method, a reverse roll-coating method, and a spray-coating method, and since the semi-noncombustible building thermal insulation material of the present invention can be manufactured by applying the noncombustible composition on a core layer or a structure in which a core layer is formed on a sheathing layer in a continuous process, no additional process is required to produce an aluminum laminated sheet to impart semi-noncombustible performance, and there is no room for problems with the handling of aluminum thin films or aluminum laminated sheets.

The structure in which a core layer is formed on a sheathing layer refers to the above-described structure formed by forming urethane foam on a sheathing material, and since the core layer and the sheathing layer are the same as described above, further detailed description thereof will be omitted.

MODES OF THE INVENTION

Various exemplary embodiments of the present invention are introduced. However, the scope of the present invention is not limited to the following exemplary embodiments.

Preparation Example 1

A noncombustible composition was prepared by mixing/stirring 15 parts by weight of aluminum oxide (manufacturer: Samwoo Chemical Co., Ltd.), 17 parts by weight of silicon oxide (manufacturer: Shinwon Chemical), 25 parts by weight of sodium silicate (manufacturer: Youngjin Chemicals Corp.), 18 parts by weight of calcium carbonate (manufacturer: Taekyung), and 25 parts by weight of water.

Preparation Example 2

A noncombustible composition was prepared by using 25 parts by weight of vinyl acetate (PVAc) instead of 25 parts by weight of water used in the noncombustible composition of Preparation Example 1.

Preparation Example 3

A noncombustible composition was prepared by mixing/stirring 23 parts by weight of aluminum oxide (manufacturer: Samwoo Chemical Co., Ltd.), 21 parts by weight of silicon oxide (manufacturer: Shinwon Chemical), 10 parts by weight of sodium silicate (manufacturer: Youngjin Chemicals Corp.), 21 parts by weight of calcium carbonate (manufacturer: Taekyung), and 25 parts by weight of water.

Preparation Example 4

A noncombustible composition was prepared by mixing/stirring 10 parts by weight of aluminum oxide (manufacturer: Samwoo Chemical Co., Ltd.), 25 parts by weight of sodium silicate (manufacturer: Youngjin Chemicals Corp.), 40 parts by weight of calcium carbonate (manufacturer: Taekyung), and 25 parts by weight of water.

Example 1

Rigid polyurethane foam having a density of 31 kg/m³ and a thickness of 50 mm was used as a core layer. On one side of the core layer, the noncombustible composition of Preparation Example 1 was applied with a basis weight of 250 g/m² and a thickness of 0.1 mm by a knife-coating method and then dried, and thus a urethane thermal insulation material was obtained.

Example 2

Rigid polyurethane foam having a density of 31 kg/m³ and a thickness of 50 mm was used as a core layer. On one side of the core layer, the noncombustible composition of Preparation Example 1 was applied with a basis weight of 490 g/m² and a thickness of 0.2 mm by a knife-coating method and then dried, and thus a urethane thermal insulation material was obtained.

Example 3

Rigid polyurethane foam having a density of 31 kg/m³ and a thickness of 50 mm was used as a core layer. On one side of the core layer, the noncombustible composition of Preparation Example 1 was applied with a basis weight of 740 g/m² and a thickness of 0.3 mm by a knife-coating method and then dried, and thus a urethane thermal insulation material was obtained.

Example 4

Rigid phenolic foam having a density of 35 kg/m³ and a thickness of 50 mm was used as a core layer. On one side of the core layer, the noncombustible composition of Preparation Example 1 was applied with a basis weight of 490 g/m² and a thickness of 0.2 mm by a knife-coating method and then dried, and thus a phenolic thermal insulation material was obtained.

Example 5

Rigid phenolic foam (thickness: 50 mm, density: 35 kg/m³) was formed on kraft paper having a basis weight of 80 g/m². On a surface of the kraft paper, the noncombustible composition of Preparation Example 1 was applied with a basis weight of 490 g/m² and a thickness of 0.2 mm by a knife-coating method and then dried, and thus a phenolic thermal insulation material was obtained.

Example 6

Expanded polystyrene having a density of 30 kg/m³ and a thickness of 50 mm was used as a core layer. On one side of the core layer, the noncombustible composition of Preparation Example 1 was applied with a basis weight of 740 g/m² and a thickness of 0.3 mm by a knife-coating method and then dried, and thus a styrene thermal insulation material was obtained.

Example 7

Rigid polyurethane foam (thickness: 50 mm, density: 31 kg/m³) was formed on kraft paper having a basis weight of 80 g/m². On a surface of the kraft paper, the noncombustible composition of Preparation Example 1 was applied with a basis weight of 490 g/m² and a thickness of 0.2 mm by a knife-coating method and then dried, and thus a urethane thermal insulation material was obtained.

Example 8

Rigid polyurethane foam (thickness: 50 mm, density: 31 kg/m³) was formed on kraft paper having a basis weight of 80 g/m². On a surface of the kraft paper, the noncombustible composition of Preparation Example 1 was applied with a basis weight of 740 g/m² and a thickness of 0.3 mm by a knife-coating method and then dried, and thus a urethane thermal insulation material was obtained.

Example 9

Rigid polyurethane foam (thickness: 50 mm, density: 31 kg/m³) was formed on glass fiber tissue having a basis weight of 50 g/m². On a surface of the glass fiber tissue, the noncombustible composition of Preparation Example 1 was applied with a basis weight of 740 g/m² and a thickness of 0.3 mm by a knife-coating method and then dried, and thus a urethane thermal insulation material was obtained.

Comparative Example 1

An aluminum laminated sheet having a basis weight of 116 g/m² and a thickness of 0.15 mm was prepared by laminating aluminum having a thickness of 7 μm and a glass fiber fabric having a basis weight of 100 g/m². On a surface of the glass fiber fabric of the aluminum laminated sheet, rigid polyurethane foam was formed with a density of 31 kg/m³ and a thickness of 50 mm as a core layer, and thus a urethane thermal insulation material was obtained.

Comparative Example 2

An aluminum laminated sheet having a basis weight of 70 g/m² and a thickness of 0.1 mm was prepared by laminating aluminum having a thickness of 7 μm and kraft paper having a basis weight of 50 g/m². On a surface of the laminated kraft paper, rigid polyurethane foam was formed with a thickness of 50 mm and a density of 31 kg/m³ as a core layer, and thus a urethane thermal insulation material was obtained.

Comparative Example 3

An aluminum laminated sheet having a basis weight of 150 g/m² and a thickness of 0.35 mm was prepared by laminating aluminum having a thickness of 25 μm, a glass fiber fabric, and fiber glass tissue (overall basis weight of glass fiber: 76 g/m²) and performing pinhole treatment. On a surface of the glass fiber of the laminate sheet, rigid polyurethane foam was formed with a thickness of 50 mm and a density of 31 kg/m³ as a core layer, and thus a urethane thermal insulation material was obtained.

Comparative Example 4

An aluminum laminated sheet having a basis weight of 150 g/m² and a thickness of 0.35 mm was prepared by laminating aluminum having a thickness of 25 μm, a glass fiber fabric, and glass fiber tissue (overall basis weight of glass fiber: 76 g/m²), and performing pinhole treatment. On a surface of the glass fiber of the laminated sheet, rigid phenolic foam was formed with a thickness of 50 mm and a density of 35 kg/m³ as a core layer, and thus a phenolic thermal insulation material was obtained.

Comparative Example 5

Rigid polyurethane foam having a thickness of 50 mm and a density of 31 kg/m³ was used as a core layer. On the rigid polyurethane foam, a fire resistant paint was applied with a basis weight of 1,190 g/m² and a thickness of 0.3 mm by a knife-coating method and then dried, and thus a urethane thermal insulation material was obtained.

Comparative Example 6

A thermal insulation material was manufactured using rigid polyurethane foam having a thickness of 50 mm and a density of 31 kg/m³ and without performing any surface treatment.

Comparative Example 7

A urethane thermal insulation material was manufactured by forming rigid polyurethane foam with a thickness of 50 mm and a density of 31 kg/m³ on a surface of glass fiber tissue having a basis weight of 50 g/m² and a thickness of 0.3 mm.

Comparative Example 8

A urethane thermal insulation material was manufactured in the same manner as in Example 3 except that the noncombustible composition of Preparation Example 2 was used.

Comparative Example 9

A urethane thermal insulation material was manufactured in the same manner as in Example 3 except that the noncombustible composition of Preparation Example 3 was used.

Comparative Example 10

A urethane thermal insulation material was manufactured in the same manner as in Example 3 except that the noncombustible composition of Preparation Example 4 was used.

The results of evaluating the heat release rates (KS F ISO 5660-1) of the thermal insulation materials manufactured in Examples 1 to 9 and Comparative Examples 1 to 10 are shown in the following Table 1.

TABLE 1

| | Items | | |
| --- | --- | --- | --- |
| | Total amount of released heat (MJ/m²) | Maximum heat release rate (seconds) (time for which 200 kW/m² was continuously exceeded) | Shape change |
| | | | Cracks, holes, melting, etc. that are unfavorable to fire prevention |
| | 8 or less | 10 seconds or less | should not occur |
| Example 1 | 6.6 | 0 | Did not occur |
| Example 2 | 2.6 | 0 | Did not occur |
| Example 3 | 1.1 | 0 | Did not occur |
| Example 4 | 3.3 | 0 | Did not occur |
| Example 5 | 7 | 0 | Did not occur |
| Example 6 | 0.8 | 0 | Did not occur |
| Example 7 | 5.8 | 0 | Did not occur |
| Example 8 | 5.5 | 0 | Did not occur |
| Example 9 | 4.6 | 0 | Did not occur |
| Comparative Example 1 | 2.5 | 0 | Did not occur |
| Comparative Example 2 | 2.7 | 0 | Did not occur |
| Comparative Example 3 | 19.3 | 0 | Did not occur |
| Comparative Example 4 | 7.6 | 0 | Did not occur |
| Comparative Example 5 | 10.4 | 0 | Did not occur |
| Comparative Example 6 | 17.2 | 0 | Cracks occurred |
| Comparative Example 7 | 19.5 | 0 | Cracks occurred |
| Comparative Example 8 | 15.9 | 0 | Did not occur |
| Comparative Example 9 | 11.7 | 0 | Did not occur |
| Comparative Example 10 | 11.3 | 0 | Did not occur |

Referring to above Table 1, it can be seen that in the case of Examples 1 to 9, although aluminum was not used in the manufacture of the semi-noncombustible building thermal insulation materials, there was no significant difference in the total amount of released heat as compared to the semi-noncombustible building thermal insulation materials of Comparative Examples 1 to 4 manufactured using aluminum, and the heat release rate test (KS F ISO 5660-1) criteria for semi-noncombustible building thermal insulation materials were satisfied.

Specifically, in the case of Examples 1 to 4, although a sheathing layer such as kraft paper was not included, the total amount of released heat was reduced by up to 60% as compared to Comparative Examples 1 and 2 including both aluminum and a sheathing layer.

Specifically, Examples 2 and 3 are different from Examples 7 and 8 only in that kraft paper was not included, but the total amount of released heat was only 45% and 20%, respectively.

When Examples 1 to 3 are compared with Comparative Example 6, it can be seen that the thermal insulation materials in which a noncombustible composition was applied, the total amount of released heat has decreased to the level of 6.4 to 38%, and the shape change of the thermal insulation materials did not occur. In addition, as the thickness of a noncombustible coating layer increased, the amount of released heat decreased.

When Example 3 is compared with Comparative Example 8, it can be seen that in the case of Comparative Example 8 where PVAc was used instead of water in a noncombustible composition, the total amount of released heat was significantly increased.

When Example 3 is compared with Comparative Example 9, it can be seen that in the case of Comparative Example 9 where the content of sodium silicate in a noncombustible composition was changed to 10 parts by weight, the total amount of released heat was increased at least 10-fold.

When Example 3 is compared with Comparative Example 10, it can be seen that in the case of Comparative Example 10 showing a large difference from the noncombustible compositions of the present invention in terms of constituent components and contents thereof, the total amount of released heat was increased at least 10-fold.

When the above-described results are summarized, it can be confirmed that a semi-noncombustible building thermal insulation material can exhibit optimal thermal insulation performance when the constituent components of a noncombustible coating layer and contents thereof satisfy a composition of the present invention.

INDUSTRIAL APPLICABILITY

A semi-noncombustible building thermal insulation material of the present invention has the following effects.

First, since an aluminum laminated sheet, the production of which requires large costs and a complicated process, is not used, production costs can be lowered, and a production process can be simplified.

Second, even though an aluminum laminated sheet is not used, excellent noncombustible performance is exhibited.

Third, compared to a thermal insulation material including an aluminum laminated sheet, adhesion with a core layer and a sheathing layer is excellent, and handling in the field is easy.

Fourth, when a noncombustible coating layer does not include an organic binder, there is an effect that volatile organic compounds (VOCs) are not generated.

The invention claimed is:

1. A semi-noncombustible building thermal insulation material, comprising:
a core layer;
a sheathing layer provided on one or both sides of the core layer; and
a noncombustible coating layer coated on an opposite side of one side of the sheathing layer in contact with the core layer or between the sheathing layer and the core layer, and having a thickness of 0.1 to 3.0 mm,
wherein the noncombustible coating layer is made of a noncombustible composition consisting of:
11 to 23 parts by weight of aluminum oxide;
15 to 21 parts by weight of silicon oxide;
19 to 32 parts by weight of sodium silicate;
15 to 21 parts by weight of calcium carbonate; and
15 to 28 parts by weight of water,
wherein the core layer is made of polyurethane foam and has a density of 15 to 60 kg/m$^3$ and a thickness of 20 to 200 mm,
wherein the sheathing layer includes one selected from the group consisting of kraft paper, glass fiber mesh, glass fiber fabric, and glass fiber tissue, and
wherein the noncombustible coating layer is provided as an individual layer distinguished from the core layer and the sheathing layer.

2. The semi-noncombustible building thermal insulation material of claim 1, wherein the noncombustible coating layer does not include an organic binder, and the semi-noncombustible building thermal insulation material does not include an aluminum thin film.

3. The semi-noncombustible building thermal insulation material of claim 1, wherein the noncombustible coating layer is directly coated onto the core layer.

4. The semi-noncombustible building thermal insulation material of claim 1, wherein the noncombustible coating layer is provided between the core layer and the sheathing layer without any intervening layer.

5. The semi-noncombustible building thermal insulation material of claim 1, wherein the noncombustible coating layer is provided with the thickness of 0.1 to 3.0 mm in a distinguished manner from the core layer and the sheathing layer.

* * * * *